United States Patent [19]
Molby

[11] 3,778,174
[45] Dec. 11, 1973

[54] ADJUSTABLE SELF-ALIGNING PIVOT BEARING, AND BALL PIN AND SOCKET EMPLOYING SAME

[75] Inventor: Lloyd A. Molby, Longview, Tex.

[73] Assignee: R. G. LeTourneau, Inc., Longview, Tex.

[22] Filed: Aug. 10, 1972

[21] Appl. No.: 279,497

Related U.S. Application Data

[62] Division of Ser. No. 94,684, Dec. 3, 1970, Pat. No. 3,711,121.

[52] U.S. Cl......403/143, 280/400, 403/149, 403/365
[51] Int. Cl............................................. B62d 53/02
[58] Field of Search........................... 280/400, 504; 180/51; 287/88, 90 C, 96

[56] References Cited
UNITED STATES PATENTS

| 3,433,502 | 3/1969 | Omon | 280/400 |
|---|---|---|---|
| 3,086,801 | 4/1963 | Herbenar | 287/88 |
| 3,347,577 | 10/1967 | Carlson | 180/51 |
| 2,886,299 | 5/1959 | Heimaster | 280/400 |
| 3,044,798 | 7/1962 | Gerner | 287/90 C |

*Primary Examiner*—Robert R. Song
*Attorney*—Wofford & Felsman

[57] ABSTRACT

A pin and socket for use in a pivot connection characterized by a shaft carrying a pivot having a spherically shaped exterior portion; a bearing having at least two sections covering substantially the entire spherical exterior portion for sustaining maximum radial and thrust forces, but having a small clearance adjacent the equator of the spherical portion for wear adjustment and for lubrication; and a cavity and thrust plate means for retaining the bearing sections fittingly engaging the spherical exterior portion of the pivot. With the disclosed structure, misalignment is prevented and the pin and socket easily and precisely adjusted for wear.

10 Claims, 4 Drawing Figures

PATENTED DEC 11 1973 3,778,174
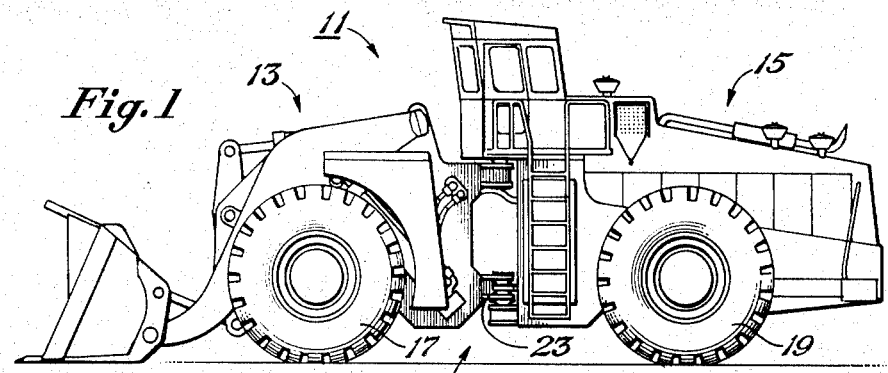
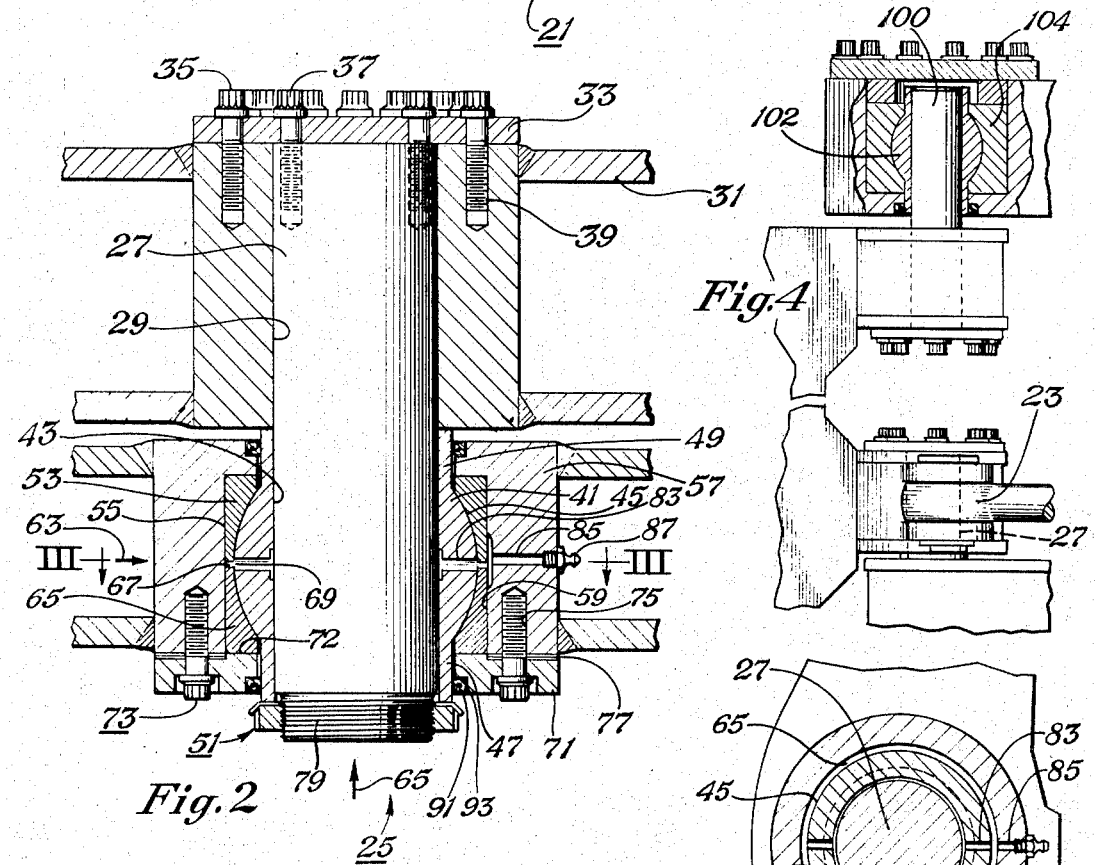
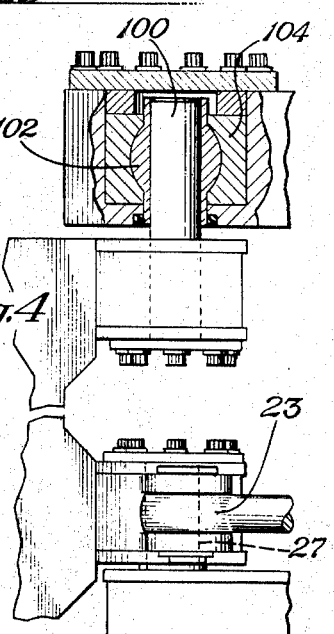
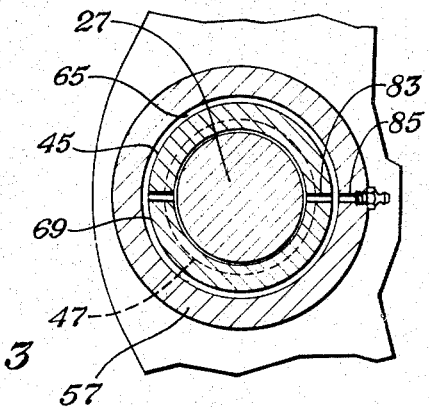

ADJUSTABLE SELF-ALIGNING PIVOT BEARING, AND BALL PIN AND SOCKET EMPLOYING SAME

This application is a division of U.S. Pat. application Ser. No. 94,684, filed Dec. 3, 1970, now U.S. Pat. No. 3,711,121.

BACKGROUND OF THE INVENTION

1. Field of the Invention

This invention relates to a pin and socket type pivot, or hinge, connection. In a particular aspect, it relates to a pin and socket such as are employed in pivot connections on articulated vehicles.

2. Description of the Prior Art

A wide variety of pin and socket type connections have been devised to meet the needs of a variety of applications. One of the most difficult applications for such pivot connections is between sections of large articulated vehicles; such as, large front end loaders, earth-moving vehicles and log loaders. A preferred type of connection has employed a ball pin connection in which a pair of ball pins are connected with one member and received in sockets on a mating yoke frame member. The big disadvantages with the ball pin type construction, heretofore, has been in obtaining and maintaining alignment, since the prior art structures had no way of compensating for wear.

The bearings for the ball pins in the prior art consisted of two types: one type was disposed about the equator of the spherical portion of the ball pin and did not extend to the top and bottom thereof. Consequently, they had good radial capacity, but had poor thrust capacity. On the other hand, bearings were provided to encompass the top half of a ball sphere to give good thrust capacity, but they lacked radial capacity.

Thus, it can be seen that the prior art devices provided either high thrust capacity or high radial capacity, but not both in one bearing or pivot connection. Moreover, the prior art devices did not provide an adjustable pivot connection in which the bearing was easily and precisely adjustable to compensate for wear and in which unhinging could be effected without disassembling the pivot connection. In addition, many prior art structures provided problems with effectively sealing of the interfaces of the pin and socket combination.

BRIEF DESCRIPTION OF THE DRAWINGS

FIG. 1 is a side elevational view of an articulated front end loader vehicle employing one embodiment of this invention.

FIG. 2 is a side elevational view, partly in section, of a pin and socket in accordance with the embodiment illustrated in FIG. 1.

FIG. 3 is a cross sectional view taken along the lines III — III of FIG. 2.

FIG. 4 is a cross sectional view of another embodiment of this invention.

DESCRIPTION OF PREFERRED EMBODIMENT(S)

It is a primary object of this invention to provide an improved pin and socket that may be employed in a pivot connection and alleviate the deficiencies of the prior art structures; and, specifically, that has the capability of sustaining both high thrust forces and high radial forces in one bearing structure, that is easily and precisely adjustable for wear, and that does not have to be disassembled for taking apart the pivot connection in which it is employed.

It is a specific object of this invention to employ a structure that, with a little manual adjustment, automatically compensates for wear and retains the bearing and the spherical exterior portion co-engaging in a precise fit, and that can be readily sealed against invasion of foreign material.

Other objects of this invention will be apparent to those familiar with the art when the following description is read in conjunction with the drawings.

Referring to FIG. 1, the present invention is shown incorporated in an articulated vehicle 11 having a front section 13 and a rear section 15. Front section 13 has a pair of front wheels 17. Rear section 15 has a pair of rear wheels 19. The front and rear sections 13 and 15 are pivotally connected via pivot connection 21 for horizontal steering movement relative to one another about a vertical axis. Specifically, a conventional hydraulic cylinder, piston and shaft arrangement between the front and rear sections on one or both sides of the pivot connection effects the desired degree of steering via a steering connection 23 in response to the steering means in the operator's console. The steering connection 23 is disposed laterally from the pivot connection 21 for a desired moment arm over which the steering force can be applied. Any other conventional methods of steering may be employed.

FIGS. 2 and 3 illustrate the bottom portion of the pivot connection 21 showing an illustrative pin and socket 25. Therein, shaft 27 is conformingly received in bore 29 in a first support member 31. The first support member 31 is connected by any conventional means such as welding with a first section; such as, front section 13; of the articulated vehicle 11.

A retainer plate means such as retainer plate 33 is carried by the first support member 31. As illustrated, the retainer plate 33 is releasably connected with one end of the shaft 27. If desired, the shaft 27 and retainer plate 33 may be integrally formed together as by upset forging. The upset forging makes finishing the shaft a little more difficult but eliminates the drilling and tapping of the interior ring of bolt apertures. Specifically, a plurality of bolts 35 and 37 serve as releasable fastening means connecting one end of the shaft 27 with the retainer plate 33 by way of suitable interiorly threaded connections, or bolt holes, 39. The bolts 35 connect the retainer plate means 33 with the first support member 31, whereas bolts 37 connect the shaft 27 with the retainer plate means 33.

A pivot means 41 is disposed about the shaft 27 adjacent its other end. The pivot means 41 has a bore 43 conformingly receiving the shaft 27. The pivot means 41 also has an exterior portion 45 of spherical configuration. As illustrated, the pivot means 41 has tubular extensions 47 and 49 on both sides of the spherical exterior portion 45. The tubular extensions 47 and 49 have the same bore 43 conformingly receiving the shaft 27. The tubular extension 49 is disposed contiguous the first support member 31 and the tubular extension 47 is disposed contiguous a retention means 51.

A second support member 57 is mounted for pivotal movement with respect to the first support member 31. The second support member 57 may be connected to the other section; such as, the rear section 15; of the articulated vehicle 11. The second support member 57 defines a cavity 59 about the pivot means 41.

A bearing means such as bearing 55 is disposed in the cavity 59 and engages the pivot means 41. As illustrated, the bearing 55 comprises a plurality of sections covering substantially the entire spherical exterior portion 45. Consequently, it allows only a few degrees of misalignment of the shaft, in contrast to prior art structure which allowed many degrees; for example, 17° of misalignment. By covering substantially the entire spherical exterior portion 45, the bearing 55 sustains maximum radial and thrust forces, indicated by arrows 63 and 65. As illustrated, the plurality of sections comprise two sections, an interior section 53 and an exterior section 65. The interior and exterior sections have a small clearance, or gap, 67 adjacent the equator 69 of the spherical exterior portion 45. The clearance 67 allows the interior and exterior sections 53 and 65 to be positioned more closely together. The sections 53 and 65 are thereby adjustably fitted to the spherical exterior portion 45 by respective movements longitudinally of the shaft 27 to compensate for wear.

A thrust plate means such as thrust plate 71 is connected with the second support member 57 and engages the exterior section 65 of the bearing 55 for retaining it engaging the spherical exterior portion 45. Specifically, the thrust plate 71 has an interiorly extending section 72 engaging the exterior bearing section 65; and bolts 73 serve as adjustable connection means removably and adjustably connecting the thrust plate 71 with the second support member 57 for retaining the bearing means fittingly engaging the spherical exterior portion. The bolts 73 engage suitable interiorly threaded connections, or bolt holes, 75 in second support member 57. Accordingly, the bolts 73 can be tightened to draw the thrust plate 71 interiorly; or upwardly, as illustrated. The thrust plate 71, in turn, moves the exterior bearing section 65 interiorly to thereby engage the spherical exterior portion 45 more closely. That is, the exterior section 65 is moved toward the first support member to compensate for wear.

At least one shim 77 is disposed intermediate the thrust plate 71 and the second support member 57. Preferably, a plurality of shims are so disposed. The shims are removable so as to allow the thrust plate 71 to be moved upwardly by tightening the bolts 73.

A retention means 51 is affixed, as by threaded connection 79, to the end of the shaft 27 holding the pivot means 41 in place on the shaft 27. The retention means may comprise a nut and locking washer. The retention means 51 is movable longitudinally of the shaft 27, as by screwing inwardly on the threaded connection 79.

A first lubrication passageway 83 communicates with the bore 43 of the pivot means 41 and with the small clearance 67 adjacent the equator 69 thereof, and allows lubrication via a passageway through the shaft 27, if desired. As illustrated, a second lubrication passageway 85 traverses through the second support member 57 and communicates with the small clearance 67 and with an exterior fitting 87, such as a Zerk fitting. This allows lubrication through the second support member where feasible.

As illustrated, a seal means such as seal 91 is provided in a suitable enclosure 93 so as to engage the tubular extensions 47 and 49 and prevent invasion of foreign matter such as dust and the like. The seals 91 sealingly engage the tubular extensions 47 and 49.

In operation, the respective elements are assembled to obtain the configuration described hereinbefore. Briefly, the interior bearing section 53 is inserted in cavity 59 and the shaft 27 and pivot means 41 is inserted. The exterior section 65 is inserted and the thrust plate 71 affixed. The retention means 51 is loosely attached and the shaft 27 connected with retainer plate 33 via bolts 37. The respective bolts, 35, 37 and 73 are suitably tightened with appropriate shims 77 inserted. Retention means 51 is also tightened and the pin and socket are ready for use.

After appreciable use, there will be wear. The retention means is kept tightened to keep the first support member 31, the shaft 27, and the pivot means 41 moving as a unit. This minimizes wear of the tubular extensions 47 and 49. A small amount of unavoidable wear may still occur. If the tubular extension 49 starts to be worn contiguous its contact with first support member 31, the retention means, or nut 51, is tightened. As the interface between the spherical exterior portion 45 and the inner bearing section 53 wears, the tightening of the bolts 73 brings the interior and exterior sections 53 and 65 to bear against the spherically shaped exterior 45. As a consequence of tightening bolts 73 to compensate for wear, the shaft 27 and the first support member 31 may be moved upwardly slightly with respect to the interior section 53. This feature affords an ingenious solution to the problem of otherwise having to emplace a shim between the top of the interior section 53 and the second support member 57. This feature does require that the upper pin and socket be "free-floating," or able to accommodate the small upward movement, as illustrated in FIG. 4. Advantageously, the upper pin and socket comprises a pin 100 with a spherically shaped exterior portion 102 within a conventional high capacity radial bearing 104 and without a thrust plate and without a retention means 51, since the upper pin and socket does not have to bear any thrust and will accommodate the small upward movement of the first support member 31 and the upper pin it also carries. Thus, wear is automatically compensated for without the inclusion of any shims intermediate the pivot means 41 and the first support member 31, and without the necessity of including any shims, longitudinally or radially with respect to the shaft 27 and intermediate the interior bearing section 53 and the second support member 57. On the other hand, longitudinal and radial shims may be employed, if desired.

With increasing wear, one of the shims 77 is removed and the thrust plate 71 moved interiorly by tightening bolts 73. The interiorly extending section 72 moves the exterior bearing section 65 inwardly, retaining the fitting and conforming engagement with the spherical exterior portion 45. The small clearance 67 allows adequate room for the interior and exterior bearing sections 53 and 65 to be moved toward each other to fittingly conform with the spherical exterior portion 45.

The continued tightening of the retention means 51, moving it upwardly on shaft 27 and the continued removal of shims 77 and the upward movement of thrust plate 71 continues to compensate for wear. Thus, the compensation for wear may be precisely and accurately made. Moreover, the tubular extensions engaging the retention means 51 and the first support member 31 automatically retain spacial orientation.

To unhinge, or take apart the sections of the vehicle 11, the shaft 27 can be readily removed downwardly out of the bore 29 by loosening bolts 37, or upwardly out of the pivot means by loosening the bolts 35 and the nut 51; without disassembling the pivot means and the bearing. When the shaft 27 and the retainer plate 33 are integral, the pin is removed from the top after removing the nut 51 and the outer ring of bolts 37. Either direction of disassembly allows retention of the precise adjustment and without the inconvenience of having to keep shims in an exact arrangement when a joint is disassembled, as in conventional structures.

Thus, it can be seen that the invention provides all of the objects delineated hereinbefore and provides a self-aligning, adjustable pin and socket with a bearing having high thrust and high radial capacity in one unit, the adjustment being easily and precisely made. Moreover, the invention provides a pin and socket in which the pivot connection can be easily unhinged without disassembling the pin, socket, and bearing, with the convenience thereby realized.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. A pin and socket comprising:
   a. a shaft;
   b. a first support member having a first bore conformingly receiving said shaft;
   c. a retainer plate means carried by said first support member and connected with one end of said shaft and with said first support member;
   d. pivot means disposed about said shaft adjacent its other end, and having a second bore conformingly receiving said shaft; said pivot means having an exterior portion of spherical configuration;
   e. a second support member mounted for pivotal movement with respect to said first support member and defining a cavity about said pivot means;
   f. bearing means disposed in said cavity and engaging said pivot means; said bearing means comprising a plurality of sections covering substantially the entire spherical exterior portion so as to allow only a few degrees of misalignment and to sustain maximum radial and thrust forces; said plurality of sections having a small clearance adjacent the equator of said spherical exterior portion for being adjustably fitted to said spherical exterior portion through respective adjusting movement longitudinally of said shaft to compensate for wear;
   g. thrust plate means engaging one of said sections of said bearing means;
   h. adjustable connection means removably and adjustably connecting said thrust plate means with said second support member for retaining said bearing means fittingly engaging said spherical exterior of said pivot means;
   i. at least one shim disposed intermediate said thrust plate means and said second support member, said shim being removable so as to allow said one section of said bearing means to be moved toward said first support member to compensate for wear; and
   j. retention means holding said pivot means in place on said shaft;
   said second bore and said shaft having uniform conforming dimensions such that said shaft can be slid out of said second bore of said pivot means without disassembling said pivot means and said bearing means with their proper wear-adjusted fit.

2. The pin and socket of claim 5 wherein said retainer plate means is a separate plate means that is separable from said shaft and is releasably connected thereto by releasable fastening means; and said first bore and said shaft have uniform and conforming dimensions such that said releasable fastening means can be released and said shaft slid out of said first bore to facilitate disassembly of said pivot connection without disassembling said pivot means and said bearing means with their proper wear-adjusted fit.

3. The pin and socket of claim 2 wherein said releasable fastening means are disconnectable from said shaft, and the remainder of said pin and socket is removable without disassembly by sliding said shaft longitudinally from said bore in said first support member.

4. The pin and socket of claim 2 wherein said first and second bores and said shaft are dimensioned such that said shaft can be slid out of both said first and second bores to facilitate disassembly of said pin and socket, without disassembly of said pivot means and said bearing means with their proper wear-adjusted fit, after release of the appropriate one of said releasable fastening means and said retention means.

5. The pin and socket of claim 4 wherein said pivot means has tubular extensions on both sides of said spherical exterior portion, one of which is disposed contiguous said first support member and one of which is disposed contiguous said retention means and wherein said retention means is movable longitudinally of said shaft toward said first member for adjustably positioning said pivot means including said tubular extension; said tubular extensions having their bores conformingly receiving said shaft.

6. The pin and socket of claim 5 wherein seal means are disposed about and sealingly engage said tubular extensions.

7. The pin and socket of claim 4 wherein said retention means is movable longitudinally of said shaft toward said first member for adjustably positioning said pivot means.

8. The pin and socket of claim 4 wherein said pivot means has a lubrication passageway communicating with its bore and communicating with said small clearance adjacent said equator, and said second support member has a second lubrication passageway communicating with said small clearance and with an exterior fitting.

9. The pin and socket of claim 4 wherein a plurality of shims are disposed intermediate said thrust plate and said support member.

10. The pin and socket of claim 9 wherein said thrust plate has an interiorly extending section engaging said bearing means.

* * * * *